US012688104B2

(12) United States Patent
Nadarajan et al.

(10) Patent No.: US 12,688,104 B2
(45) Date of Patent: Jul. 21, 2026

(54) COMPUTING DEVICE WITH BRIDGE TO NATIVE APP FOR SECURITY AND RESILIENCY

(71) Applicant: CITRIX SYSTEMS, INC., Fort Lauderdale, FL (US)

(72) Inventors: Sabarish Nadarajan, Fort Lauderdale, FL (US); Rachelle Tobkes, Pembroke Pines, FL (US); Salu Kurian, Fort Lauderdale, FL (US); Avijit Gahtori, Fort Lauderdale, FL (US); Patrick Viafore, Madison, AL (US); Naman Arora, Fort Lauderdale, FL (US)

( * ) Notice: Subject to any disclaimer, the term of this patent is extended or adjusted under 35 U.S.C. 154(b) by 210 days.

(21) Appl. No.: 17/936,052

(22) Filed: Sep. 28, 2022

(65) Prior Publication Data

US 2024/0103990 A1     Mar. 28, 2024

(51) Int. Cl.
G06F 11/30          (2006.01)
G06F 16/958         (2019.01)

(52) U.S. Cl.
CPC ........ G06F 11/3051 (2013.01); G06F 16/986 (2019.01)

(58) Field of Classification Search
CPC .......................... G06F 11/3051; G06F 16/986
See application file for complete search history.

(56) References Cited

U.S. PATENT DOCUMENTS

| | | | | |
|---|---|---|---|---|
| 2014/0157110 A1* | 6/2014 | Abbott, Jr. | ............. | G06Q 40/12 |
| | | | | 715/234 |
| 2018/0349283 A1* | 12/2018 | Bhatia | .................. | H04N 21/431 |
| 2019/0356701 A1* | 11/2019 | Prabhu | ................ | H04L 65/1069 |
| 2020/0374121 A1* | 11/2020 | Momchilov | .......... | H04L 9/0825 |
| 2022/0188504 A1* | 6/2022 | Singh | .................... | G06F 40/186 |

* cited by examiner

*Primary Examiner* — Joe Chacko

(57)                ABSTRACT

A client computing device includes a display and a processor coupled to the display. The processor operates a browser to access a store providing resources that are available. The available resources are displayed within a web page on a display. A launch message is generated in response to one of the resources being selected. An extension cooperating with the browser is operated to append a store ID identifying the store to the launch message. An adapter is operated to receive from the extension the launch message with the store ID, and assign a native messaging host process to the store. The native messaging host process is external the extension and supports communications with a native app on the client computing device. The native app is used to initiate launch of the selected resource.

18 Claims, 12 Drawing Sheets

10

CLIENT
MACHINE(S)
12

CLIENT
MACHINE
12A

CLIENT
MACHINE
12B

• • •

CLIENT
MACHINE
12N

NETWORK
14

Appliance
18

NETWORK
14'

SERVER(S) 16

REMOTE
MACHINE
16A

REMOTE
MACHINE
16B

• • •

REMOTE
MACHINE
16N

COMPUTING DEVICE WITH BRIDGE TO NATIVE APP FOR SECURITY AND RESILIENCY

TECHNICAL FIELD

The present disclosure relates to computing systems, and more particularly, to a computing device accessing resources using connection leases for security and resiliency.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer.

Using client-server technology, a remote desktop may be stored in and administered by a remote server, rather than in the local storage of a computing device. The computing device accesses the remote desktop in a remote computing session with the server. The remote computing session allows a user to access resources. The resources, for example, include SaaS and web apps, desktops, files and data.

SUMMARY

A client computing device includes a display and a processor coupled to the display. The processor operates a browser to access a store providing resources that are available. The available resources are displayed within a web page on a display. A launch message is generated in response to one of the resources being selected. An extension cooperating with the browser is operated to append a store ID identifying the store to the launch message. An adapter is operated to receive from the extension the launch message with the store ID, and assign a native messaging host process to the store. The native messaging host process is external the extension and supports communications with a native app on the client computing device. The native app is used to initiate launch of the selected resource.

The adapter may be operated to map the store ID to an ID of the assigned native messaging host process, with the mapping being used to route messages between the extension and the native app.

The browser may be further operated to access additional stores for launching available resources associated with the additional stores, and the adapter may be further operated to assign a native messaging host process to each additional store, and to map the ID of each additional store to the ID of the assigned native messaging host process. The IDs are unique for each additional store and each assigned native messaging host process.

The messages between the extension and the adapter may be multiplexed over a single channel, and the messages between the adapter and the native message host process may be demultiplexed.

The messages between the native messaging host process and the native app may be based on a first in/first out (FIFO) process.

The web page may be displayed within a browser tab having a user interface (UI) associated therewith, and wherein the extension comprises a browser extension that includes a content script and a background script. The content script may be injected into the user interface of the browser tab to relay the launch message to the background script that runs in the background within the browser extension.

The background script may be configured to append the store ID to the launch message.

The extension may further include an app extension that communicates with the background script, with the app extension to receive the launch message with the store ID that is then forwarded to the adapter.

The background script and the app extension may be sandboxed from communicating with the adapter. The app extension may be configured to receive an entitlement to bypass the sandbox and provide the launch message with the store ID to the adapter.

The extension comprises a browser extension that communicates with an app extension that then communicates with the adapter, and wherein messages from the adapter are asynchronously received by the app extension over a single channel. The browser extension may use a polling mechanism to fetch the asynchronous messages from the app extension.

The browser extension may provide a list of active store IDs to the adapter via the app extension as part of the polling mechanism. Each store ID corresponds to a respective native messaging host process. The list of active store IDs may be used as a heartbeat signal by the adapter so as to monitor a life cycle of the native messaging host processes. The adapter may quit a native message host process in response to the store ID corresponding to that process not being actively used.

Another aspect is directed to a method for operating the client computing device as described above. The method includes operating a browser to access a store providing resources that are available, with the available resources being displayed within a web page on a display. A launch message is generated in response to one of the resources being selected. An extension cooperating with the browser is operated to append to the launch message a store ID identifying the store. An adapter is operated to receive from the extension the launch message with the store ID, and assign a native messaging host process to the store. The native messaging host process is external the extension and supports communications with a native app on the client computing device. The native app is used to initiate launch of the selected resource.

Yet another aspect is directed to a non-transitory computer readable medium for operating a client computing device that includes a display and a processor coupled to the display, with the non-transitory computer readable medium having a plurality of computer executable instructions for causing the processor to perform the method steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
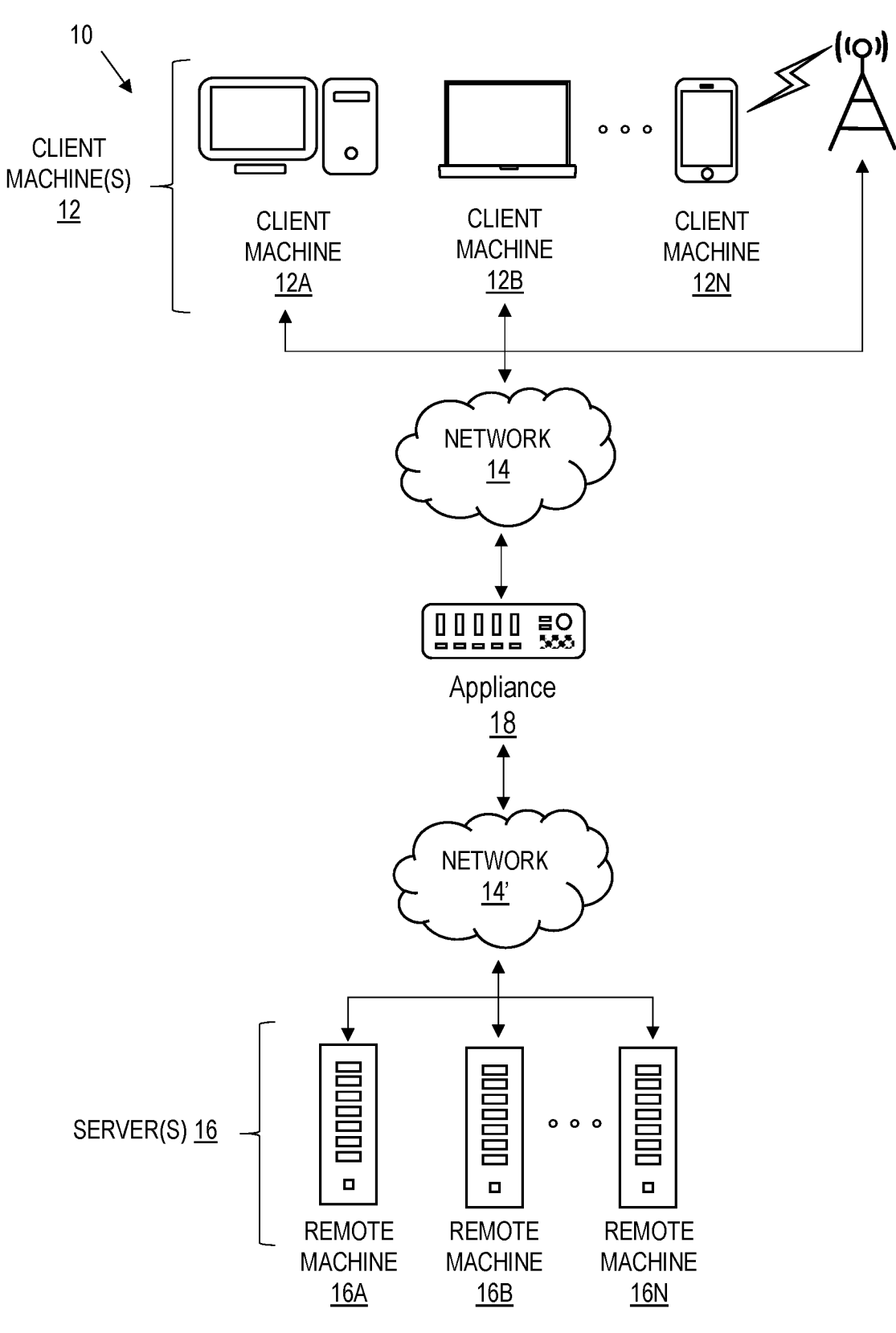
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'. In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
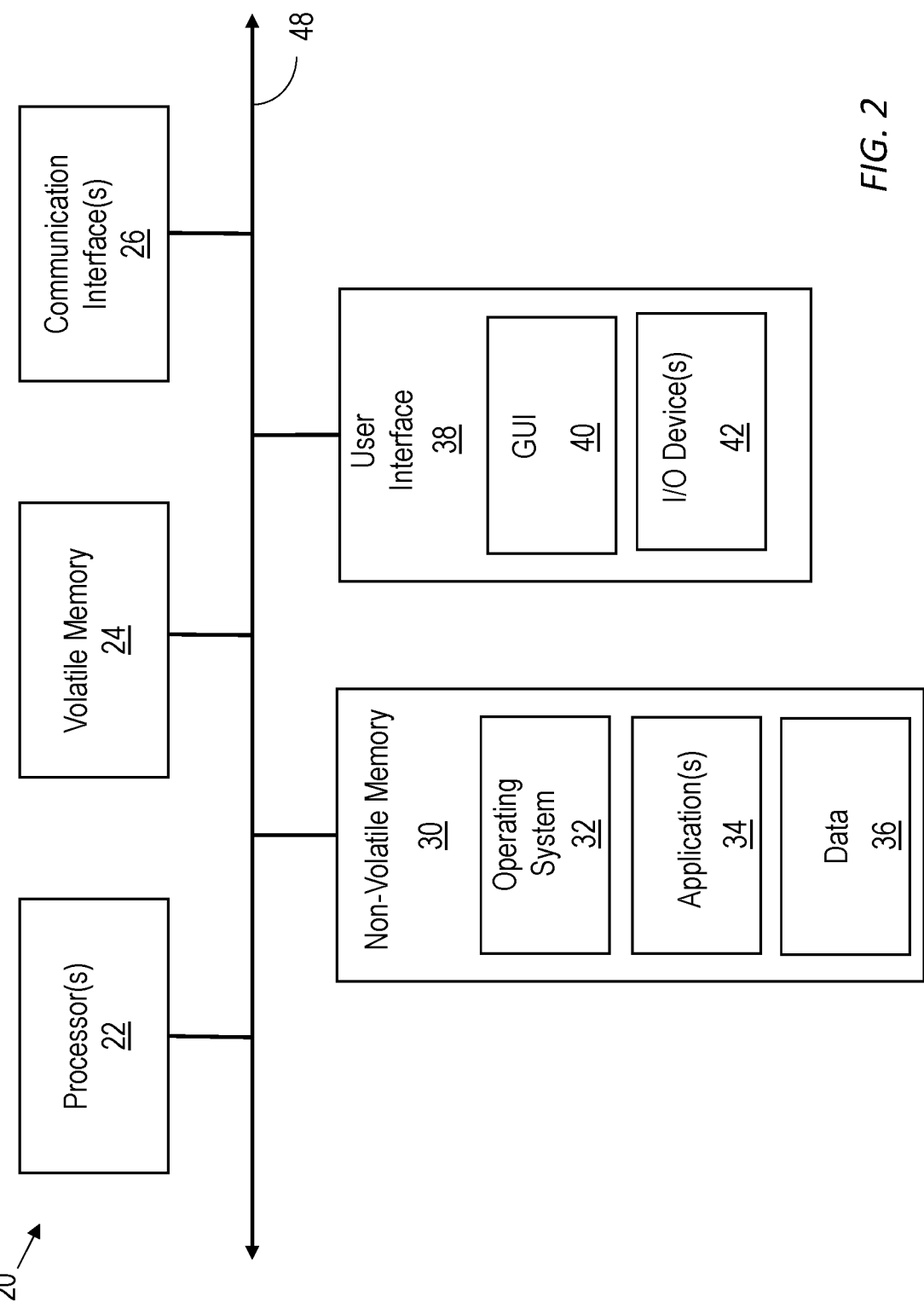
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
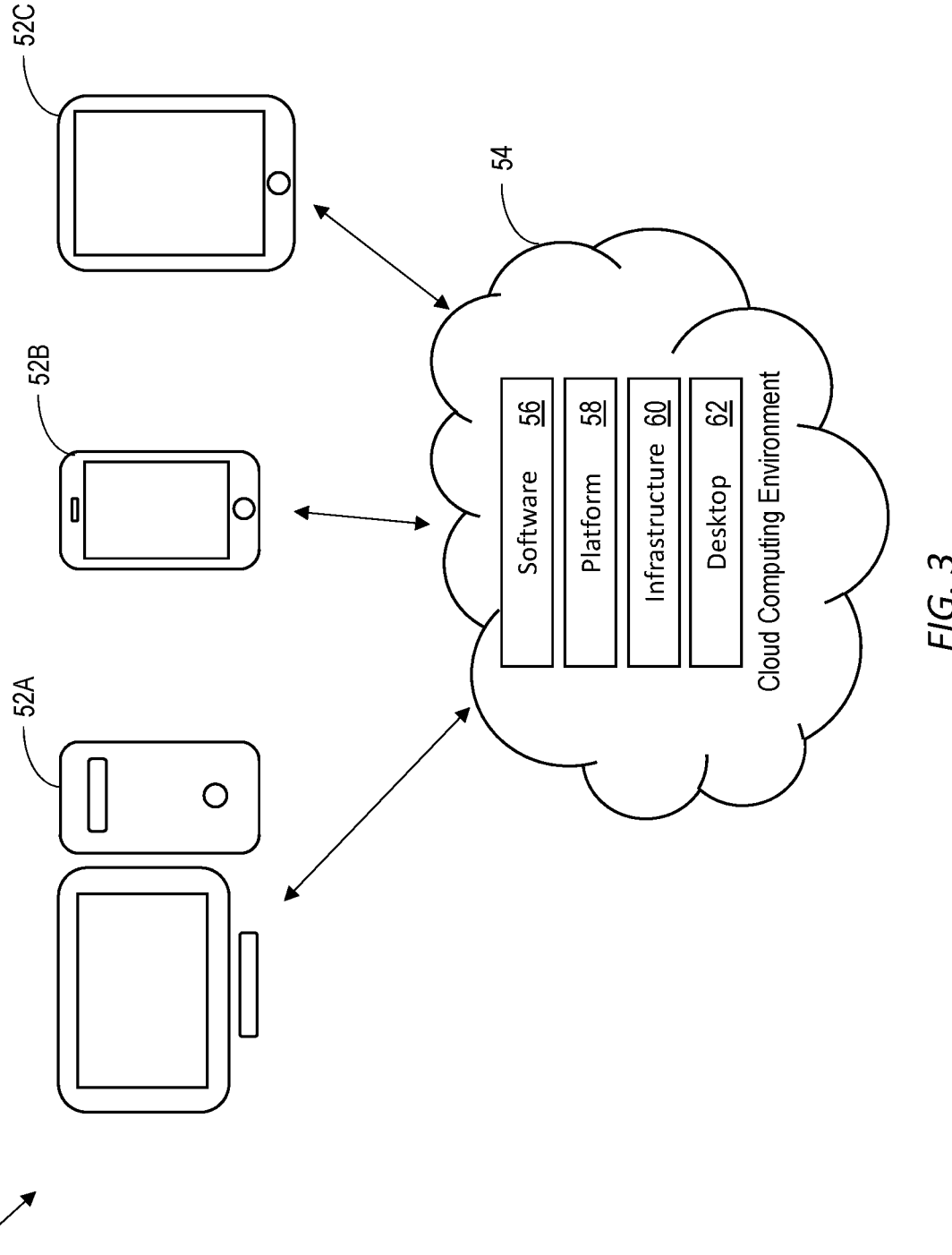
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONE-DRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
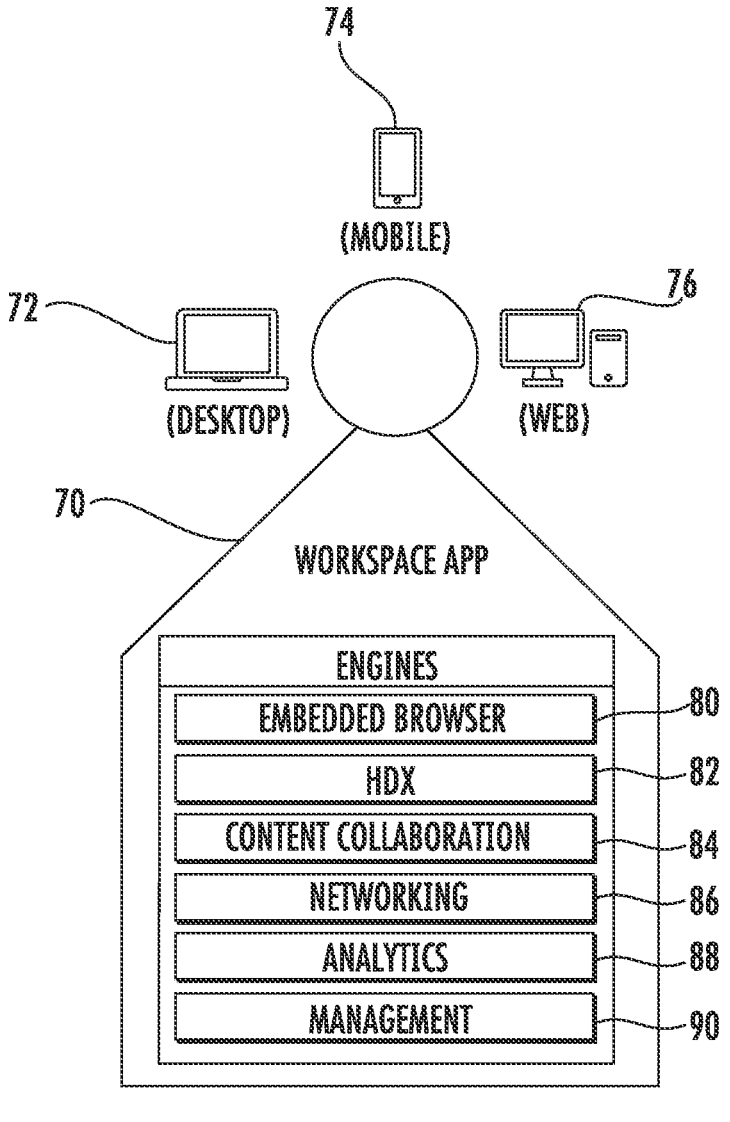
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
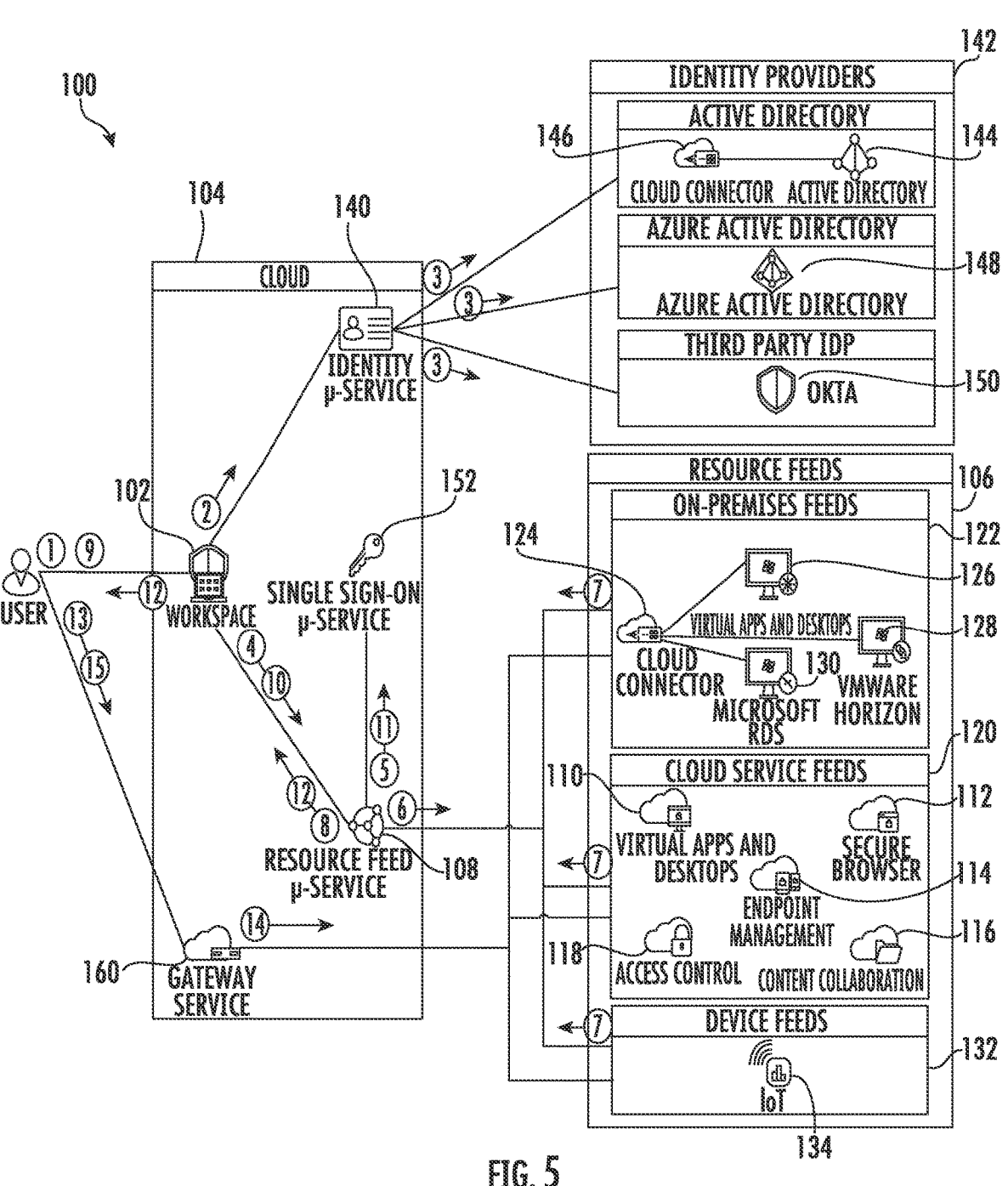
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Another aspect of the disclosure is directed to client computing devices accessing workspace/storefront resources using connection leases. The resources that are available in a store within the storefront include virtual apps and remote desktops.

Connection leases provide long-lived and mostly static entitlements to the resources the users are entitled to access. Connection leases are relatively long-lived in that they can be updated on a less frequent basis (e.g., to account for changes in user permissions, network addresses, etc.).

Resiliency may further be provided through the use of Progressive Web App (PWA) Service Worker caching, which allows for web-based user interfaces (UIs) to be functional even in offline or degraded network conditions. A service worker is a script that runs in the browser and manages caching for an application. Service workers function as a network proxy.

Both connection leases and PWA-cached resources are typically user and device specific by design, in that their lifetime is aligned with a user logging in/logging out on a specific device. In this way, the connection leases provide for security by being bound to the specific device. The connection leases are generated by a connection lease issuing service (CLIS) based upon a public key associated with the device, and therefore need to be authenticated by the corresponding private key stored securely on the client computing device. The client computing device may also referred to as an endpoint device.

Connection lease generation and workspace platform functions including user authentication are performed within a cloud computing service (e.g., Citrix Cloud) which includes a cloud interface. The cloud interface is configured to interface with the client computing device for enrollment and lease generation to access available resources. The cloud interface may be implemented with Citrix Workspace, and the client computing device may be running the Citrix Workspace App 70 as discussed above. The Citrix Workspace App 70 may also be generally referred to as a workspace app.

A browser on the client computing device is typically used to assess the workspace/storefront. Example browsers that are compatible with the workspace app 70 include the Google Chrome browser and the Microsoft Edge browser. A browser extension is used with these browsers to provide compatibility with the workspace app 70.

The browser extension for both the Chrome and Edge browsers can seamlessly communicate with a native app on the client computing device by using native messaging host (NMH) processes. Native messaging host (NMH) processes are external the browser extensions and support communications with native apps installed on the client computing device. Messages are sent from Workspace UI within a browser tab to the browser extension and then forwarded to the native messaging host processes which then communicate with the native app on the client computing device. In particular, the native messaging host processes provide pipes (i.e., connections) to a session manager which then coordinates launch of the resources. The session manager is a native app and is part of the workspace app 70 on the client computing device.

A problem arises in that the above-described architecture is not portable to all browsers, such as the Safari browser, for example. The Safari browser is developed by Apple, Inc. and operates with a macOS operating system. The lack of portability is due to the limitation of the Safari browser extensions being sandboxed and not having native messaging host capabilities.

In addition, Safari browser extensions are bundled with an app extension component that runs as a background process initiated by Safari. The Safari browser extensions listen to incoming messages from a background script and send back replies. However, there cannot be more than one app extension instance per browser. There are also limitations to initiating messages from the app extension which prevents the ability of the Safari browser extension to receive asynchronous messages or messages initiated from the native messaging host processes.

Figure 6:
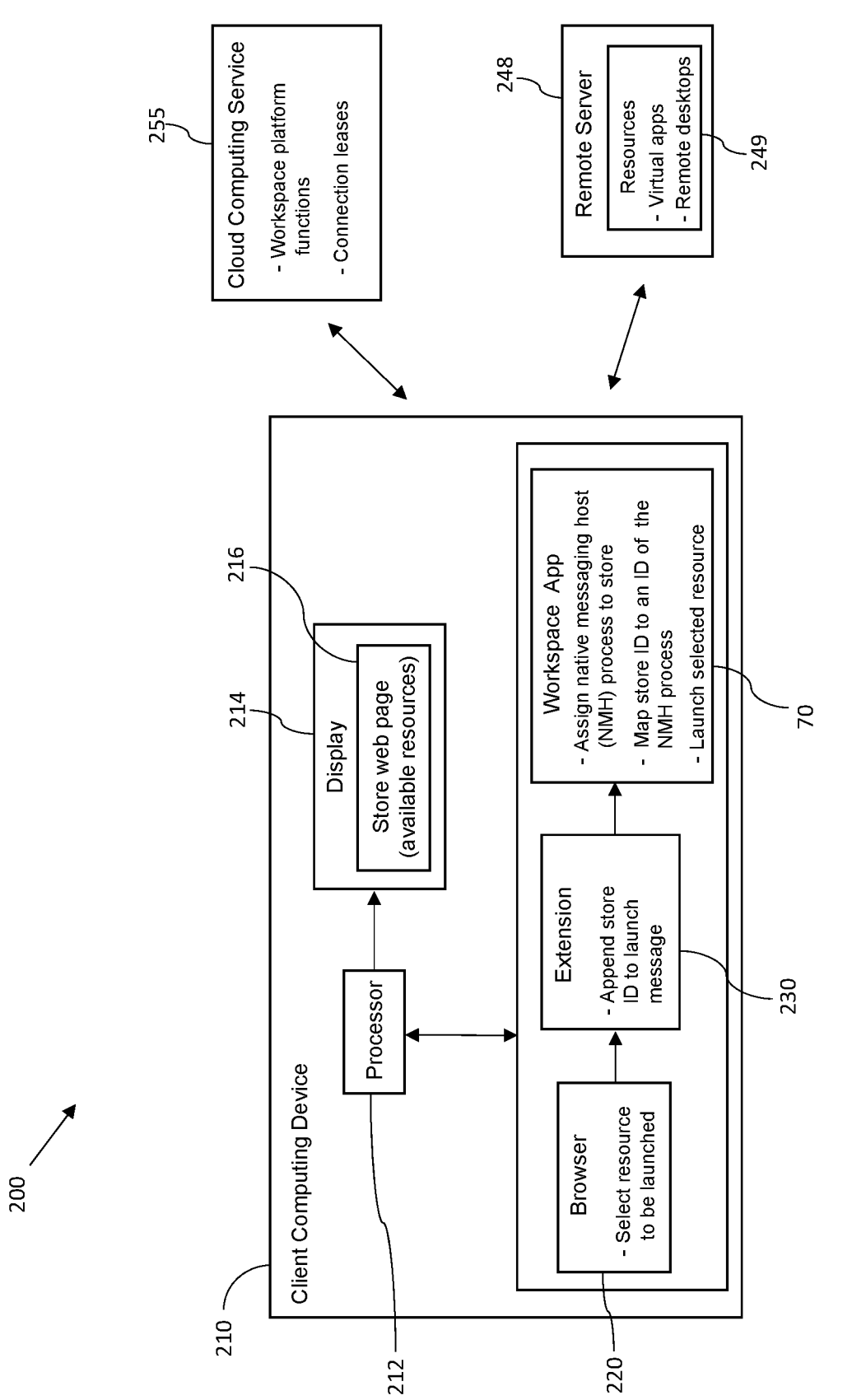
FIG. 6 is a schematic block diagram of a computing system with a client computing device having native messaging host capabilities according to aspects of the disclosure.

Referring now to the computing system 200 in FIG. 6, native messaging host capabilities are being provided to a client computing device 210 operating with a browser 220 that does not support native messaging host capabilities. The native messaging host capabilities are included in the workspace app 70 installed on the client computing device 210. Native messing host processes are external the browser 220, and allow communications with native apps on the client computing device 210. In the case of the Safari browser, there are no inherent native messaging host capabilities.

The client computing device 210 includes a display 214, and a processor 212 coupled to the display. The processor 212 is configured to operate the browser 220 to access a store providing resources that are available to the user. The client computing device 210 interfaces with a cloud computing service 255 that provides workspace platform functions and connection leases in addition to storefront functions. The available resources are displayed within a web page 216 on the display 214.

A launch message is generated in response to one of the resources being selected. The processor 212 operates an extension 230 cooperating with the browser 220 to append to the launch message a store ID identifying the store. The processor 212 then operates an adapter within the workspace app 70 to receive from the extension the launch message with the store ID, and assign a native messaging host process to the store. The native messaging host process is external the extension and supports communications with a native app (e.g., a session manager) on the client computing device 210.

The native app is used to initiate launch of the selected resource. The selected resource 249 may be a virtual app or a remote desktop, for example. The resource 249 may be launched using a remote server 248. In addition to the remote server 248, the resources 249 may be launched on-prim.

Figure 7:
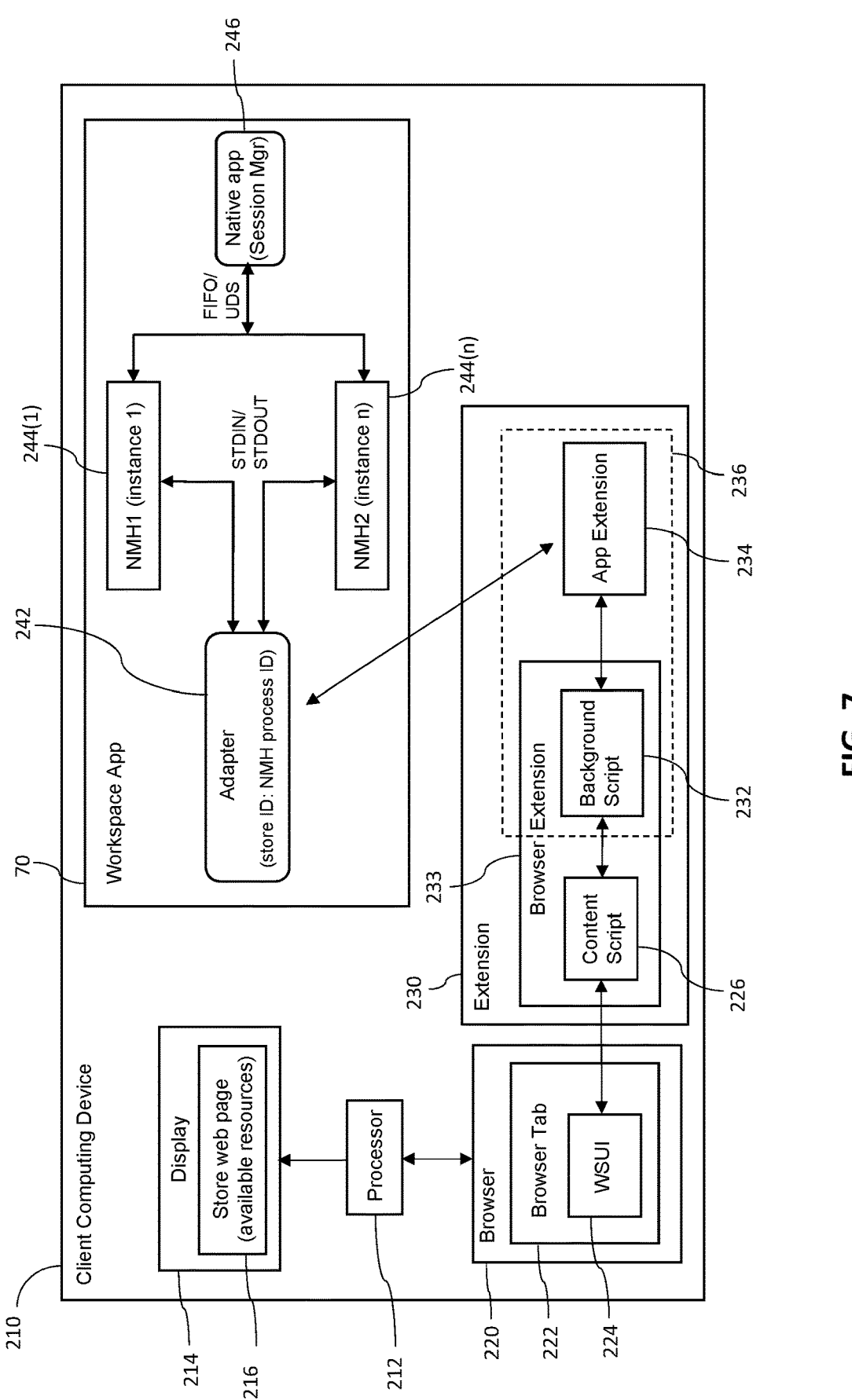
FIG. 7 is a more detailed schematic block diagram of the client computing device illustrated in FIG. 6.

Referring now to FIG. 7, the client computing device 210 will be discussed in greater detail. The browser 220 is used to access the store providing the resources that are available to the user. The store is located using a URL (uniform resource locator).

The available resources are displayed as a web page 216 within a tab 222. The tab 222 has a workspace user interface (WSUI) 224 associated therewith. In response to one of the available resources being selected by the user, a launch message is generated.

An extension 230 cooperates with the browser 220 to append to the launch message a store ID identifying the store. The extension 230 is made up of several components. These components include a content script 226, a background script 232, and an app extension 234. Collectively, the content script 226 and the background script 232 may be referred to as a browser extension 233.

One of the limitations of the browser 220 is that certain APIs are not available in order to allow a web page to talk directly to the browser extension. An example API that is not available is chrome.runtime.sendMessage API. Consequently, the browser 220 does not support sending the launch message directly from the workspace UI 224 to the background script 232 via the chrome.runtime.sendMessage API.

To address this limitation, the content script 226 is injected into the WSUI 224. The content script 226 allows the WSUI 224 to communicate with the content script 226, as well as the content script 226 being able to communicate with the background script 232.

The background script 232 receives the launch message from the content script 226, and appends to the launch message a store ID identifying the store. The background script 232 is continuously running in the browser 220 as long as the browser is running, whereas the content script 226 is running in the tab 222 as long as the tab is open.

The WSUI 224 may use the dispatchEvent method of the EventTarget to invoke an EventListener in the content script 226. Launch messages, such as ICALaunch and LeaseLaunch, are sent to the content script 226 which then utilizes the available chrome.runtime.sendMessage API to communicate with the background script 232.

In addition, the browser 220 blocks access to cookies from the background script 232. To overcome this, the content script 226 is additionally used as a proxy when making ajax requests which require WSUI/DSAuth cookies, such as CLSync messages. The content script 226 makes the ajax request and returns the result to the background script 232.

The background script 232 communicates with the app extension 234. Both the background script 232 and the app extension 234 are sandboxed, as indicated by a dashed line 236. The sandbox is intended to restrict these components from accessing parts of the client computing device 210 for security reasons, such as the workspace app 70.

The background script 232 is limited to providing the launch message with the store ID to the app extension 234. The app extension 234 is configured to receive an entitlement to bypass the sandbox and provide the launch message with the store ID to the adapter 242 within the workspace app 70.

The launch message and the store ID may be referred to as a BNP protocol message. The background script 232 needs to first Stringify the BNP Protocol message before sending it to the app extension 234 in order to maintain the structure and integrity of the message.

The overall information appended to the launch message by the background script 232 may be referred to as store context information. The store context information includes a store ID, a user ID and a store URL. The store context information later allows the launch message to be forwarded to the proper native messaging host process 244(1), 244(n) within the workspace app 70. An example appended launch message is provided below:

```
{
    messageWrapper:"{\"message\":{\"header\":{\"type\":\"B2
    C_IcaFileLaunchReq\",\"seqNum\":167,\"flags\":[\"TraceF
    ull\"]},\"payload\":{\"icaFile\":\"W0VuY29kaW5nXQ0KSW5w
    dXRFbmNvZG...",
    storeContext: {
        storeId: "6abb8560-ae11-48f9-8dca-31fb8f10eec0",
        userId: "779n52f5-47b8-4918-9e06-52c4b3bb5c99",
        storeUrl: https://myworkprod0.cloud.com
    }
}
```

The adapter 242 receives the launch message with the store ID, as included within the appended store context information. The adapter 242 then assigns one of the native messaging host processes 244(1), 244(n) to the store ID. Each store accessed by the user will have a dedicated native messaging host process assigned thereto.

The native messaging host processes 244(1), 244(n) support communications with the native app 246. As noted above, the session manager is a native app 246 that is part of the workspace app 70. The session manager 246 is used to initiate launch of the selected resource.

The session manager 246 communicates with the remote server 248 to launch the selected resource. In other cases, the session manager 246 may communicate with an on-prim network or locally on the client computing device 210 to launch the selected resource. Once the resource has been launched, a window or session is opened for display on the client computing device 210 within the same browser tab 222.

Messages between the app extension 234 and the adapter 242 are asynchronous and are multiplexed over a single channel. Messages between the adapter 242 and the native message host processes 244(1), 244(n) are demultiplexed. The messages between the native messaging host processes 244(1), 244(n) and the session manage 246 are based on a first in/first out (FIFO) process.

The adapter 242 handles the lifecycle of the native messaging host processes 244(1), 244(n). The adapter 242 starts a native messaging host process on receipt of an initialize message from the app extension 234. The adapter 242 also shuts down a native messaging host process when not in use. This determination is made based checking for a heartbeat signal that is periodically received from the app extension 234. The heartbeat signal is part of a polling mechanism used by the browser extension 233 to retrieve the asynchronous messages from the app extension 234.

To retrieve an asynchronous message, the browser extension 233 provides a list of active store IDs to the app extension 234 which is then forwarded to the adapter 242. Each store ID corresponds to a respective native messaging host process. The list of active store IDs is used as the heartbeat signal by the adapter 242 so as to monitor a life cycle of the native messaging host processes 244(1), 244(n). The adapter 242 quits a native message host process in response to the store ID corresponding to that process not being actively used.

The adapter 242 runs as a daemon process within the workspace app 70. The adapter 242 is a new component to the workspace app 70 and serves as a bridge between the app extension 234 and the session manager 246. The native messaging host processes 244(1), 244(n) and the session manager 246 are compatible with the Chrome/Edge browser extensions for launching resources without requiring modifications to these components.

Multiple workspace stores are handled by multiplexing the messages from the app extension 234 to the adapter 242. Each store is assigned to a particular native messaging host process 244(1), 244(n). In-turn, the adapter 242 demultiplexes the messages and forwards them to the correct native messaging host process 244(1), 244(2) for which it belongs. The mapping of the workspace store ID to the native messaging host process ID is used to differentiate the messages for the various workspace stores.

A secure channel is used for communicating between the app extension 234 and the adapter 242. In one approach, the secure channel is based on Apple's XPC IPC mechanism to send encrypted messages between the two components. Before connecting to the adapter 242, the app extension 234 validates that it is signed. Likewise, before accepting a new connection, the adapter 242 validates the signature of the connecting process.

To overcome the limitations of proper asynchronous messaging channels from the app extension 234 to the browser 220, the polling mechanism as discussed above is used. The polling mechanism is initiated from the browser extension 233 and occurs every two minutes. The polling mechanism is used to fetch any asynchronous messages or messages which initiated from the native messaging hosts 244(1), 244(2) or the adapter 242.

For example, a telemetry launch message may be received asynchronously after a shadow lease launch completes is fetched via the polling mechanism. When these messages are polled, the active workspace store IDs are sent. The polling mechanism is also used as a heartbeat signal, as discussed above. The adapter 242 terminates the native messaging host processes 244(1), 244(2) due to them no longer being in use, such as in response to a browser being closed. When the adapter 242 does not receive the heartbeat signal within a certain amount of time, the adapter 242 knows to quit the native messaging host processes 244(1), 244(2) for the store IDs that are inactive.

Figure 8:
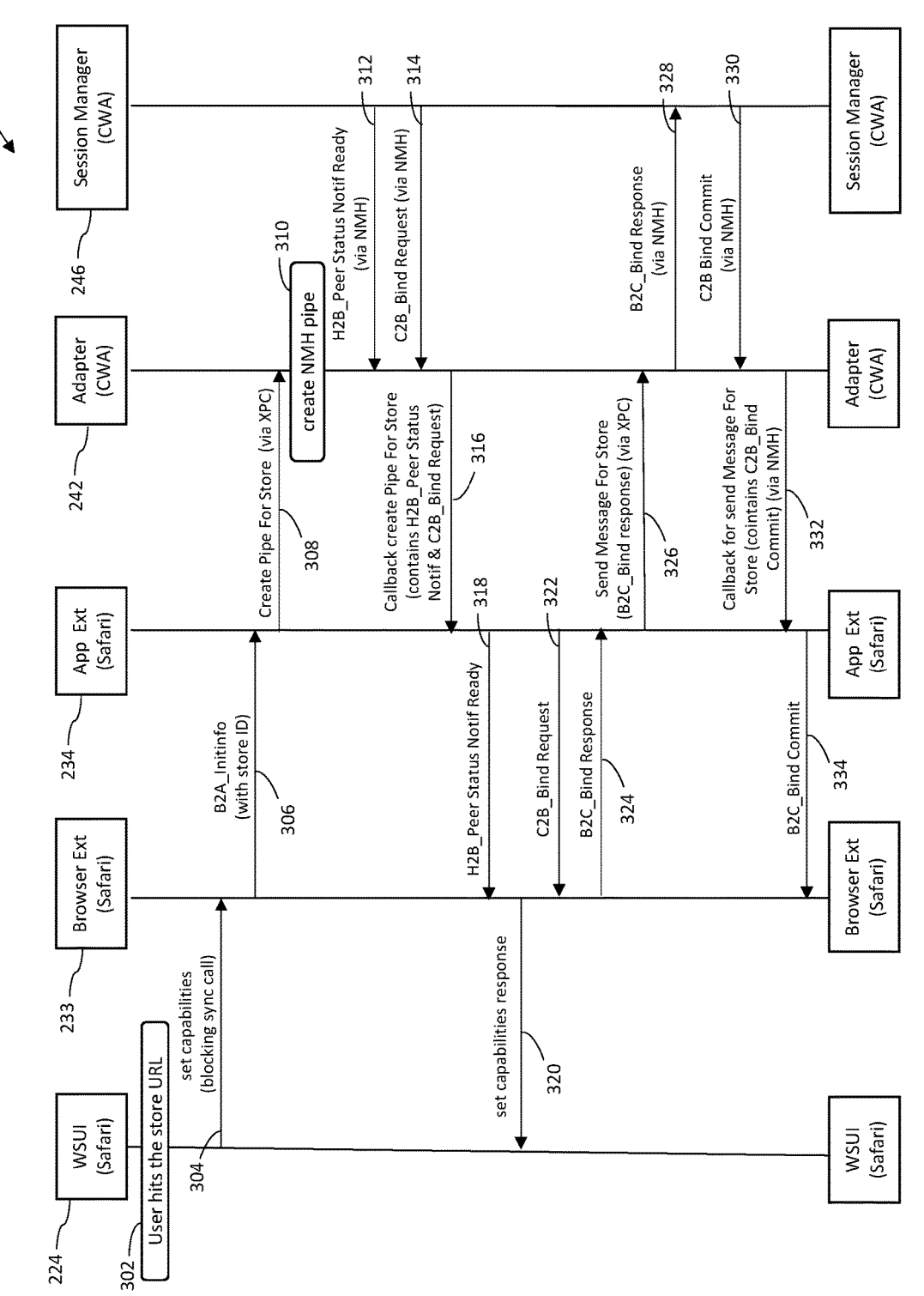
FIG. 8 is a sequence diagram for initializing a native messaging host pipe for the client computing device illustrated in FIG. 6.

Referring now to FIG. 8, a sequence diagram 300 for initializing a native messaging host pipe 244(1), 244(n) for the computing system 200 will be discussed. Most of the messages being exchanged in the sequence diagram 300 includes letter designations, such as B2A, B2C and H2B, for example. The letter designations are used to further identify the components sending and receiving the messages.

The letter B corresponds to the browser extension 233. The letter A corresponds to the app extension 234. The letter C corresponds to the workspace app 70, such as the Citrix workspace app 70. The letter H corresponds to the native messaging hosts 244(1), 244(n). The number 2 is used between the letters to provide a direction of the message.

At Block 302 the user hits the store URL at the workspace UI 224. This generates a set capabilities call at line 304 that is sent from the workspace UI 224 to the browser extension 233.

The set capabilities call is a message for an information exchange regarding the capabilities of the browser 220 and the workspace. The background script 232 within the browser extension 233 receives the set capabilities call. The background script 232 then forwards this message to the app extension 234 at line 306 as a call for initialization.

The app extension 234 sends a creative pipe for store message at line 308 to the adapter 242. This message corresponds to the app extension 234 calling a method in the adapter 242. The message sends a user ID and store information to the adapter 242. Upon receipt of this message from the app extension 234, the adapter 242 creates a native messaging host pipe 244(1), 244(n) at line 310. The native messaging host pipe may also be referred as a connection. The store corresponding to the store URL selected by the user will be assigned one of the native messaging host pipes 244(1), 244(n).

Once the native messaging host pipe has been created, the session manager 246 sends back a ready message at line 312 and a bind request at line 314 to the adapter 242. The adapter 242 then sends a callback save pipe for store message at line 316 to the app extension 233. The app extension 233 forwards this message to the browser extension 233 at line 318, which then forwards a set capabilities response message to the workspace UI 224 at line 320.

Once the bind request message is received by the browser extension 233 at line 322, the browser extension 233 sends back a bind response at line 324. The app extension 234 relays this message to the adapter 242 as a send message for store message at line 326. At line 328 the session manager 246 receives a bind response message from the adapter 242, and at line 330 a bind commit message is sent from the session manager 246 to the adapter 242. The bind response and bind commit messages contain information for the capability negotiations, such as what version is being used as well as what cryptographic algorithms should be uses for encryption.

The adapter 242 forwards a callback for send message for store message to the app extension 234 at line 332. A final bind commit message is sent by the app extension 234 to the browser extension 233 at line 334.

The sequence diagram 300 may depict the modified workflow for a BNP initialization handshake, for example. Since the Citrix architecture uses a request/response model, wait-ng for a native messaging host to send a PeerReady request is not possible. Instead, this request is, initiated by sending a B2A_InitPipe message from the background script 232 which then sends a createPipe ( ) message to the adapter 242. The adapter 242 starts the native messaging host process for the workspace store and responds with H2B_PeerStatusNotif. Likewise, sending a C2B_BindRequest message to the adapter 242 and all the way back to the browser extension 233 is not feasible. To solve this, both the H2B_PeerStatusNoLif and the C2B_BindReguest are sent in single message. The app extension 234 caches the C2B_BindRequest message until it is requested for from the background script 232.

Figure 9:
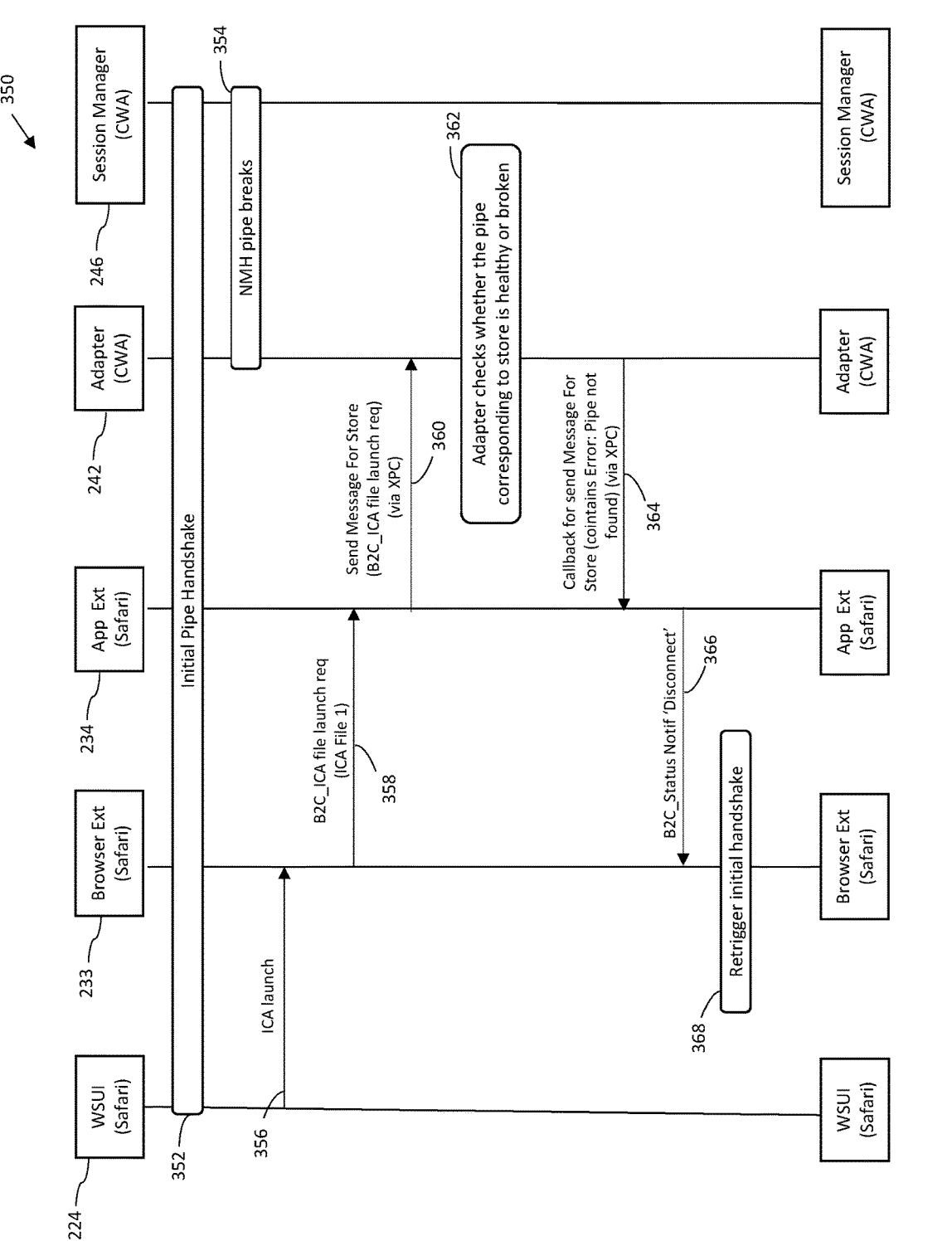
FIG. 9 is a sequence diagram for error handling in the case where a native messaging host pipe breaks for the client computing device illustrated in FIG. 6.

Referring now to FIG. 9, a sequence diagram 350 for error handling in the case where a native messaging host pipe breaks 244(1), 244(n) for the computing system 200 will be discussed. Before sending a message to the respective native messaging host, the adapter 242 verifies if the process is alive or dead. If the process is dead, the adapter 242 replies to the app extension 234 with a H2B_ResetNotif, and the background script 232 then retriggers the handshake as laid out in FIG. 8 to reconnect the native messaging host pipe.

Block 352 is the initial pipe handshake performed for creating a pipe or connection between the native messaging hosts 244(1), 244(n) and the session manager 246. The pipe breaks or disconnects in Block 354.

Line 356 corresponds to a user selecting a resource to be launched. The resource may be an application that is available from the store. The launch may be an ICA launch (i.e., connected to resources) or a lease launch (i.e., there is an outage and the networks or services are down). In the lease launches, the UI changes to represent that there is an outage and all the launches are going to be lease based launches.

The ICA launch is passed from the browser extension 233 to the app extension 234 at line 358. The app extension 234 calls the appropriate message in the adapter 242 at line 360. At this point, the adapter 242 will check if the pipe corresponding to the store is broken or is still healthy at Block 362. If everything is normal, it sends back a message saying ICA launch is successful. But if something has happened to the pipe, such as the messaging host process corresponding to that particular store is broken, then the adapter 242 is going to send back a message saying what the error is at line 364.

In this case, a pipe has not been found. And that message, when it goes back to the browser extension at line 366 causes the browser extension 233 to retrigger the initial handshake in Block 368. This causes the pipe to be restarted again by sending another bind request message back to the adapter 242. The adapter 242 will see that it is to create a new messaging host for the store.

Figure 10:
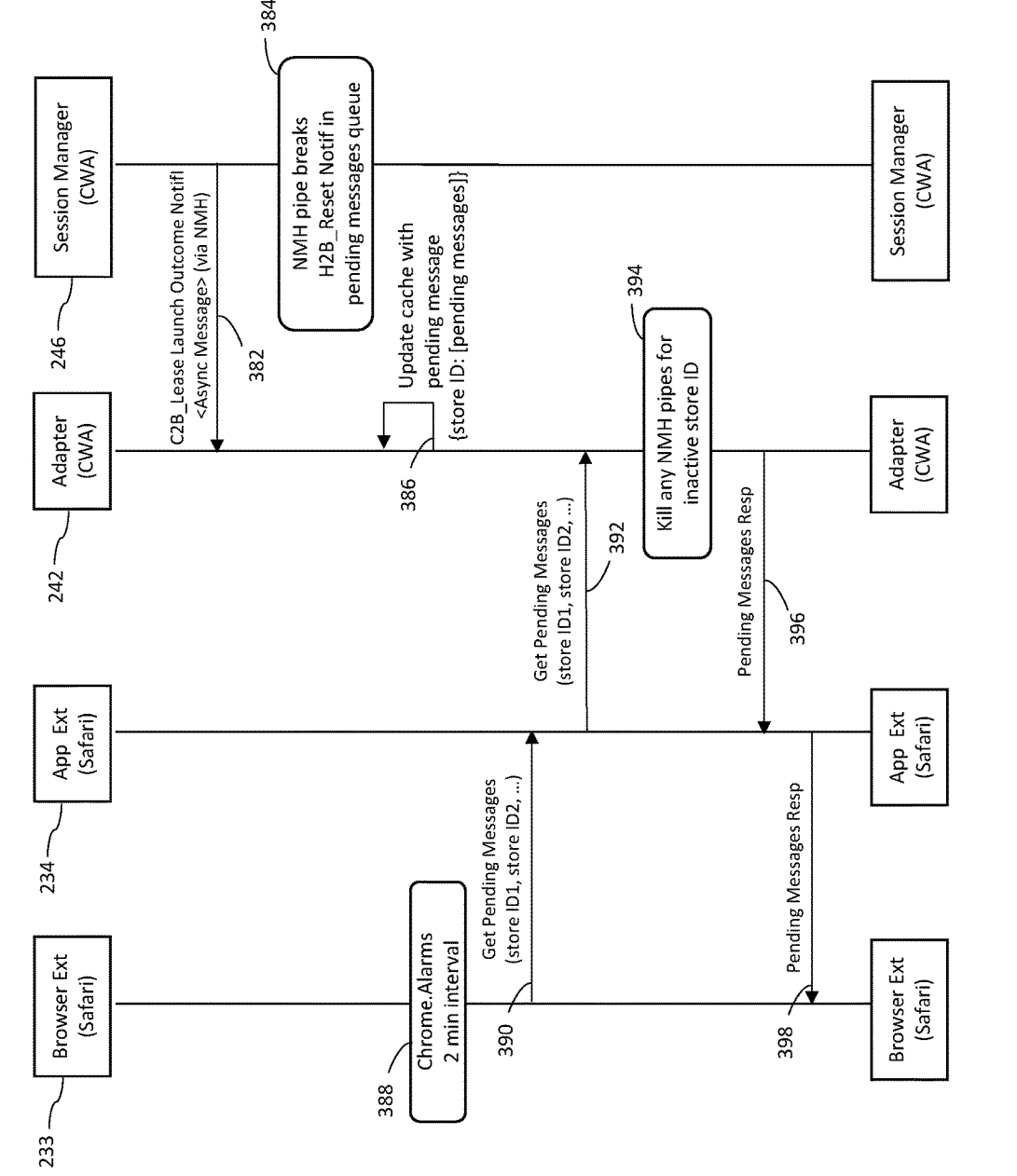
FIG. 10 is a sequence diagram on a polling mechanism for fetching asynchronous messages for the client computing device illustrated in FIG. 6.

Referring now to FIG. 10, a sequence diagram 380 of a polling mechanism for fetching asynchronous messages for the computing system 200 will be discussed. The adapter 242 stores certain messages that are asynchronous that cannot be forwarded instantaneously. These messages are stored so that the browser extension 233 can periodically poll for these messages. The get pending messages is an example method being used.

Messages with "Notif" are example asynchronous messages. Messages such as C2B_LeaseLaunchOutComeNotif at line 382 are sent to the adapter 242 from the session manager 246 via the native messaging host pipe. The adapter 242 then caches these messages in a PendingMessages queue at line 386, which is a map of StoreID: [PendingMessages]. Other asynchronous messages include H2B_ResetNotif, which occurs when a native messaging host pipe breaks as in Block 384. These types of messages are also added to the queue.

In the sequence diagram 380, the Store ID 1 and Store ID 2 are all the tabs that are open that have a particular store running in the browser 233. A store ID is a unique value that is assigned to the particular workspace store that a user logs onto. A user can be in a browser 220 running multiple tabs with multiple stores. Since each of these stores will have a unique Store ID, this is what is being used in the adapter 242 to map to a particular native messing host pipe. Each store will have its own native messing host pipe, and the store IDs are mapped to the respective native messaging host pipes.

A Chrome.Alarms in Block 388 is used to fetch the pending messages at a two minute interval. The browser extension 233 sends a getPendingMessages request at line 390 to the app extension 234 along with an array of active storeIDs. The app extension 234 then calls the same method in the adapter 242 at line 392. When the adapter 242 receives this message, it then returns the PendingMessages response at line 396 for all the active storeIDs in the array. If a storeID is missing from the array, but is still mapped to an NMH-ProcessID, the adapter 242 will terminate the native messaging host process for that storeID in Block 394. The PendingMessages response is relayed from the app extension 234 to the browser extension 233 at line 398.

Figure 11:
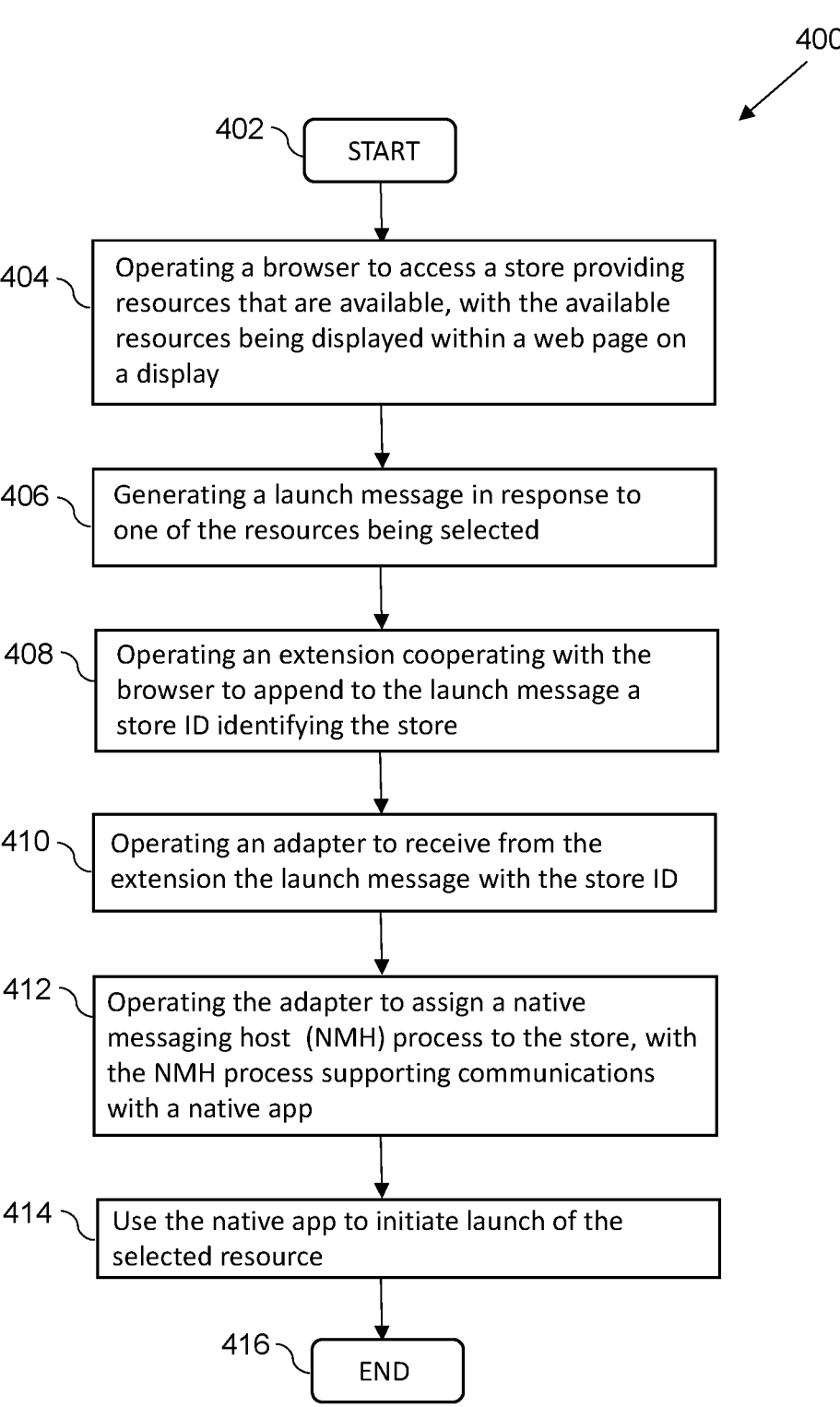
FIG. 11 is a flow diagram on operating the client computing device illustrated in FIG. 6.

Referring now to FIG. 11, a flow diagram 400 for operating the above-described client computing device 210 will be discussed. From the start (Block 402), a browser 220 is operated at Block 404 to access a store providing resources that are available, with the available resources being displayed within a web page 216 on a display 214.

A launch message is generated at Block 406 in response to one of the resources being selected. An extension 233 cooperating with the browser 220 is operated at Block 408 to append to the launch message a store ID identifying the store. An adapter 242 is operated at Block 410 to receive from the extension the launch message with the store ID, and to assign at Block 412 a native messaging host process 244(1), 244(n) to the store. The native messaging host process 244(1), 244(n) is external the extension 230 and supports communications with a native app 246 on the client computing device 210. The native app 246 is used to initiate launch of the selected resource at Block 414. The method ends at Block 416.

Figure 12:
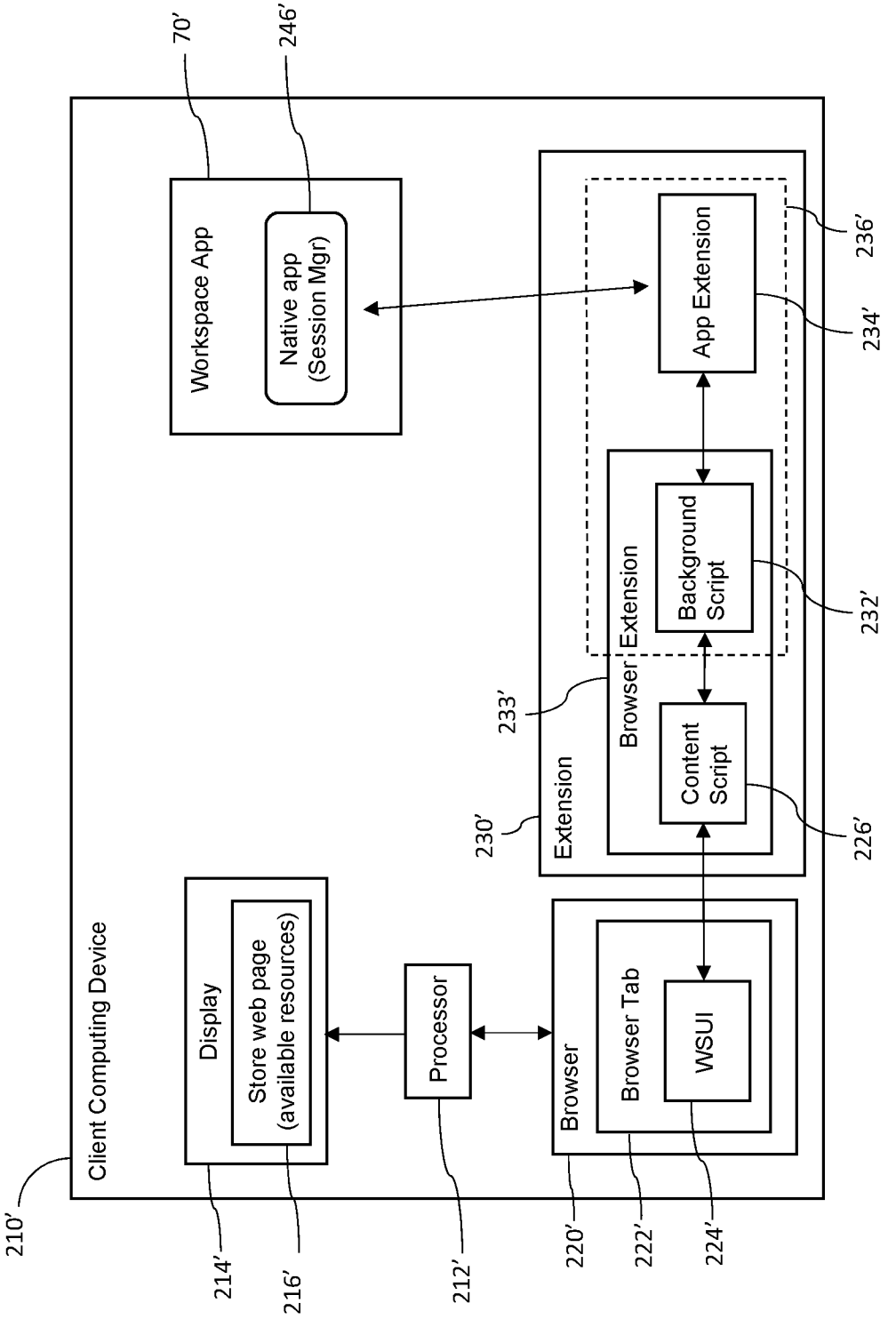
FIG. 12 is a schematic block diagram of another embodiment of the client computing device illustrated in FIG. 7 with a direct connection between the extension and the native app.

Referring now to FIG. 12, another embodiment of the client computing device 210' with a direct connection between the app extension 234' and the native app 246' will be discussed. The workspace app 70' does not require the adapter 242 or the native messaging host processes 244(1), 244(n) as discussed above. An advantage of eliminating the adapter 242 and the native messaging host processes 244(1), 244(n) is that multiplexing and demultiplexing messages from multiple stores/tabs is no longer needed as above.

A direct connection is established between the app extension 234' and the session manager 246'. The direct connection is a secure channel. In one approach, the secure channel is based on Apple's XPC IPC mechanism to send encrypted messages between the two components. To accommodate the secure connection, the session manager 246' is modified. Modifications include providing certificate validations and capability negotiations between session manager 246' and the app extension 234'.

Furthermore, other aspects of the computing system and the client computing devices may take the form of a computer program product stored by one or more computer-readable storage media having computer-readable program code, or instructions, embodied in or on the storage media, for operation thereof. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A client computing device comprising:
a display; and
a processor coupled to said display and configured to perform the following:
operate a browser to access a store providing resources that are available, with the available resources being displayed within a web page on said display;
generate a launch message in response to one of the resources being selected;
operate an extension cooperating with the browser to append to the launch message a store ID identifying the store; and
operate an adapter to perform the following:
receive from the extension the launch message with the store ID,
assign a native messaging host process to the store, with the native messaging host process being external the extension and supports communications with a native app on the client computing device, and with the native app being used to initiate launch of the selected resource; and
map the store ID to an ID of the assigned native messaging host process, with the mapping being used to route messages between the extension and the native app.

2. The client computing device according to claim 1 wherein the browser is further operated to access additional stores for launching available resources associated with the additional stores, and wherein the adapter is operated to assign a native messaging host process to each additional store, and to map the ID of each additional store to the ID of the assigned native messaging host process, with the IDs being unique for each additional store and each assigned native messaging host process.

3. The client computing device according to claim 1 wherein messages between the extension and the adapter are multiplexed over a single channel, and wherein messages between the adapter and the native message host process are demultiplexed.

4. The client computing device according to claim 1 wherein messages between the native messaging host process and the native app are based on a first in/first out (FIFO) process.

5. The client computing device according to claim 1 wherein the web page is displayed within a browser tab having a user interface (UI) associated therewith; and wherein the extension comprises a browser extension that includes a content script and a background script, with the content script being injected into the user interface of the browser tab to relay the launch message to the background script that runs in the background within the browser extension.

6. The client computing device according to claim 5 wherein the background script is configured to append the store ID to the launch message.

7. The client computing device according to claim 6 wherein the extension further includes an app extension that communicates with the background script, with the app extension to receive the launch message with the store ID that is then forwarded to the adapter.

8. The client computing device according to claim 7 wherein the background script and the app extension are sandboxed from communicating with the adapter, with the app extension configured to receive an entitlement to bypass the sandbox and provide the launch message with the store ID to the adapter.

9. The client computing device according to claim 1 wherein the extension comprises a browser extension that communicates with an app extension that then communicates with the adapter, and wherein messages from the adapter are asynchronously received by the app extension over a single channel, with the browser extension using a polling mechanism to fetch the asynchronous messages from the app extension.

10. The client computing device according to claim 9 wherein the browser extension provides a list of active store IDs to the adapter via the app extension as part of the polling mechanism, with each store ID corresponding to a respective native messaging host process, with the list of active store IDs being used as a heartbeat signal by the adapter so as to monitor a life cycle of the native messaging host processes, with the adapter quitting a native message host process in response to the store ID corresponding to that process not being actively used.

11. A method comprising:
operating a browser to access a store providing resources that are available, with the available resources being displayed within a web page on a display;
generating a launch message in response to one of the resources being selected;
operating an extension cooperating with the browser to append to the launch message a store ID identifying the store; and
operating an adapter to perform the following:
receive from the extension the launch message with the store ID,
assign a native messaging host process to the store, with the native messaging host process being external the extension and supports communications with a native app on the client computing device, and with the native app being used to initiate launch of the selected resource; and
map the store ID to an ID of the assigned native messaging host process, with the mapping being used to route messages between the extension and the native app.

12. The method according to claim 11 further comprising:
operating the browser to access additional stores for launching available resources associated with the additional stores;
operating the adapter to assign a native messaging host process to each additional store, and to map the ID of each additional store to the ID of the assigned native messaging host process, with the IDs being unique for each additional store and each assigned native messaging host process.

13. The method according to claim 11 further comprising:
multiplexing messages between the extension and the adapter over a single channel; and
demultiplexing messages between the adapter and the native message host process.

14. The method according to claim 11 wherein messages between the native messaging host process and the native app are based on a first in/first out (FIFO) process.

15. The method according to claim 11 wherein the web page is displayed within a browser tab having a user interface (UI) associated therewith, and wherein the extension comprises a browser extension that includes a content script and a background script, the method further comprising injecting the content script into the user interface of the browser tab to relay the launch message to the background script that runs in the background within the browser extension.

16. The method according to claim 15 wherein the background script is configured to append the store ID to the launch message.

17. The method according to claim 16 wherein the extension further includes an app extension that communicates with the background script, with the app extension to receive the launch message with the store ID that is then forwarded to the adapter.

18. A non-transitory computer readable medium for operating a client computing device comprising a display and processor coupled to the display, and with the non-transitory computer readable medium having a plurality of computer executable instructions for causing the processor to perform steps comprising:
operating a browser to access a store providing resources that are available, with the available resources being displayed within a web page on a display;
generating a launch message in response to one of the resources being selected;
operating an extension cooperating with the browser to append to the launch message a store ID identifying the store; and
operating an adapter to perform the following:
receive from the extension the launch message with the store ID,
assign a native messaging host process to the store, with the native messaging host process being external the extension and supports communications with a native app on the client computing device, and with the native app being used to initiate launch of the selected resource; and
map the store ID to an ID of the assigned native messaging host process, with the mapping being used to route messages between the extension and the native app.

* * * * *